US008661804B2

(12) United States Patent
Wagner

(10) Patent No.: US 8,661,804 B2
(45) Date of Patent: Mar. 4, 2014

(54) CONTROL SYSTEM FOR SWASHPLATE PUMP

(75) Inventor: Christoph Wagner, Westmont, IL (US)

(73) Assignee: Caterpillar Inc., Peoria, IL (US)

( * ) Notice: Subject to any disclaimer, the term of this patent is extended or adjusted under 35 U.S.C. 154(b) by 1097 days.

(21) Appl. No.: 12/636,199

(22) Filed: Dec. 11, 2009

(65) Prior Publication Data

US 2011/0138799 A1 Jun. 16, 2011

(51) Int. Cl.
*F16D 31/02* (2006.01)

(52) U.S. Cl.
USPC .................................. 60/327; 60/405; 60/452

(58) Field of Classification Search
USPC ............... 60/403, 443, 445, 452, 327; 91/506
See application file for complete search history.

(56) References Cited

U.S. PATENT DOCUMENTS

| | | | | |
|---|---|---|---|---|
| 4,194,361 | A * | 3/1980 | Pahl et al. | 60/388 |
| 4,381,702 | A * | 5/1983 | Myers | 91/506 |
| 4,456,434 | A | 6/1984 | El Ibiary | |
| 4,476,680 | A | 10/1984 | Pollman et al. | |
| 4,518,319 | A | 5/1985 | Ring | |
| 4,518,320 | A | 5/1985 | Goodell | |
| 5,017,094 | A | 5/1991 | Graf et al. | |
| 6,167,702 | B1 | 1/2001 | Schniederjan | |
| 2007/0101709 | A1* | 5/2007 | Cronin | 60/445 |
| 2008/0236156 | A1* | 10/2008 | Kakino et al. | 60/443 |

FOREIGN PATENT DOCUMENTS

| | | | |
|---|---|---|---|
| JP | 05044650 | | 2/1993 |
| JP | 05044650 | A * | 2/1993 |
| JP | 07167062 | | 7/1995 |
| JP | 11182443 | | 7/1999 |
| KR | 100228539 | | 11/1999 |

OTHER PUBLICATIONS

"HPV-02. Variable Pumps for Closed Loop Operation" by Linde Hydraulics, pp. 1-36, downloaded from http://www.linde-hydraulics.com/hpv_02_variable_displacement_pumps.shtml on Dec. 11, 2009.

* cited by examiner

*Primary Examiner* — Edward Look
*Assistant Examiner* — Logan Kraft
(74) *Attorney, Agent, or Firm* — Finnegan, Henderson, Farabow, Garrett & Dunner LLP

(57) ABSTRACT

A control system for a swashplate pump is disclosed. The control system may have a tiltable swashplate, at least one actuator movable to tilt the swashplate, a supply of pressurized fluid, and a drain. The control system may also have a first circuit connectable to the supply of pressurized fluid and to the drain and configured to control operation of the at least one actuator, and a second circuit connectable to the supply of pressurized fluid and to the drain and configured to control operation of the at least one actuator. The control system may further have a failsafe valve configured to connect the first circuit to at least one of the supply and the drain only during a normal operating condition, and to connect the second circuit to the supply and to the drain only during a failsafe condition.

20 Claims, 2 Drawing Sheets

CONTROL SYSTEM FOR SWASHPLATE PUMP

TECHNICAL FIELD

This disclosure relates generally to a control system and, more specifically, to a control system for a swashplate pump.

BACKGROUND

Variable displacement hydraulic pumps are commonly used to provide adjustable flows of pressurized fluid to machine actuators, for example to cylinders or motors associated with moving machine tools or linkages. Based on a demand of the actuators, the displacement of the pump is either increased or decreased such that the actuators move the tools and/or linkage at an expected speed and/or with an expected force.

Typical variable displacement pumps used in hydraulic tool systems are known as swashplate-type pumps. This type of pump includes a plurality of plungers held against a plunger engagement surface of a tilted swashplate. In most situations, the swashplate is generally planar and includes a smooth driving surface. A joint such as a ball and socket joint is disposed between each plunger and the engagement surface to allow for relative movement between the swashplate and the plungers. Each plunger is slidably disposed to reciprocate within an associated barrel as the plungers and tilted surface of the swashplate rotate relative to each other. As each plunger is retracted from the associated barrel, low-pressure fluid is drawn into that barrel. When the plunger is forced back into the barrel by the plunger engagement surface of the swashplate, the plunger pushes the fluid from the barrel at an elevated pressure. In this configuration, the output of the pump can be varied by adjusting a tilt angle of the swashplate.

Historically, the swashplate of a pump has been tilted to a desired angle by one or more actuators connected to a side of the swashplate. As the actuator is extended or retracted, the swashplate is caused to tilt about a pivot axis. One or more solenoid-operated valves associated with the swashplate are controlled in response to various inputs to either direct pressurized fluid to the actuator to extend the actuator, or to drain fluid from the actuator to retract the actuator, thereby adjusting the tilt angle of the swashplate.

Although functionally adequate to control the pump, the solenoid-actuators described above may be problematic in some situations. For example, when power to the solenoid-actuators fails or when input used to control the solenoid-actuators is faulty, the tilt angle of the swashplate may be improperly adjusted or not adjusted at all.

One attempt to improve pump displacement control is described in U.S. Pat. No. 4,194,361 (the ’361 patent) issued to Pahl et al. on Mar. 25, 1980. Specifically, the ’361 patent describes a swashplate pump having a group of solenoid valves that can control displacement of the pump during normal operation, and a manual valve that can override the group of solenoid valves and control displacement of the pump during emergency conditions. The manual valve is linked to a mechanical override that is movable by an operator. During normal operation, the mechanical override is maintained in a deactivated state by spring pressure, and a controller communicates with the group of valves to adjust displacement of the pump in response to a manual input and a displacement position of the pump. During emergency conditions, for example when electrical failure has occurred, the mechanical override can be moved by a human operator to control displacement adjustments of the pump via the manual valve.

Although the ’361 patent may provide for pump control during emergency conditions, the provided control may be limited. That is, the ’361 provides for only manual control during the emergency conditions, and there may be some situations when manual control is insufficient or undesired.

The disclosed hydraulic control system is directed to overcoming one or more of the disadvantages set forth above and/or other problems of the prior art.

SUMMARY

In one aspect, the present disclosure is directed toward a control system for a pump. The control system may include a tiltable swashplate, at least one actuator movable to tilt the swashplate, a supply of pressurized fluid, and a drain. The control system may also include a first circuit connectable to the supply of pressurized fluid and to the drain and configured to control operation of the at least one actuator, and a second circuit connectable to the supply of pressurized fluid and to the drain and configured to control operation of the at least one actuator. The control system may further include a failsafe valve configured to connect the first circuit to at least one of the supply and the drain only during a normal operating condition, and to connect the second circuit to the supply and to the drain only during a failsafe condition.

In another aspect, the present disclosure is directed toward another control system for a pump. This control system may include a tiltable swashplate, at least one actuator movable to tilt the swashplate, a supply of pressurized fluid, and a drain. The control system may also include a least a first electrically powered valve configured to selectively connect the supply and the drain to the at least one actuator to move the at least one actuator to a desired position, and a second valve mechanically connected to the swashplate and configured to selectively connect the supply and the drain to the at least one actuator to move the tiltable swashplate toward a neutral position. The pump may further include a third electrically powered valve energized to connect the at least a first electrically powered valve to the supply and the drain during a first condition, and spring-biased to connect the second valve to the supply and the drain during a second condition.

In yet another aspect, the present disclosure is directed toward a method of controlling a swashplate pump. The method may include displacing a main flow of fluid from the swashplate pump, and selectively directing a pilot flow of fluid to and from an actuator of the swashplate pump via a first path to adjust a displacement of the swashplate pump during a first operating condition. The method may also include overriding control of the actuator via the first path by controlling flow to and from the actuator via a second path to shift the swashplate pump towards a non-displacement position during a second condition.

DETAILED DESCRIPTION

Figure 1:
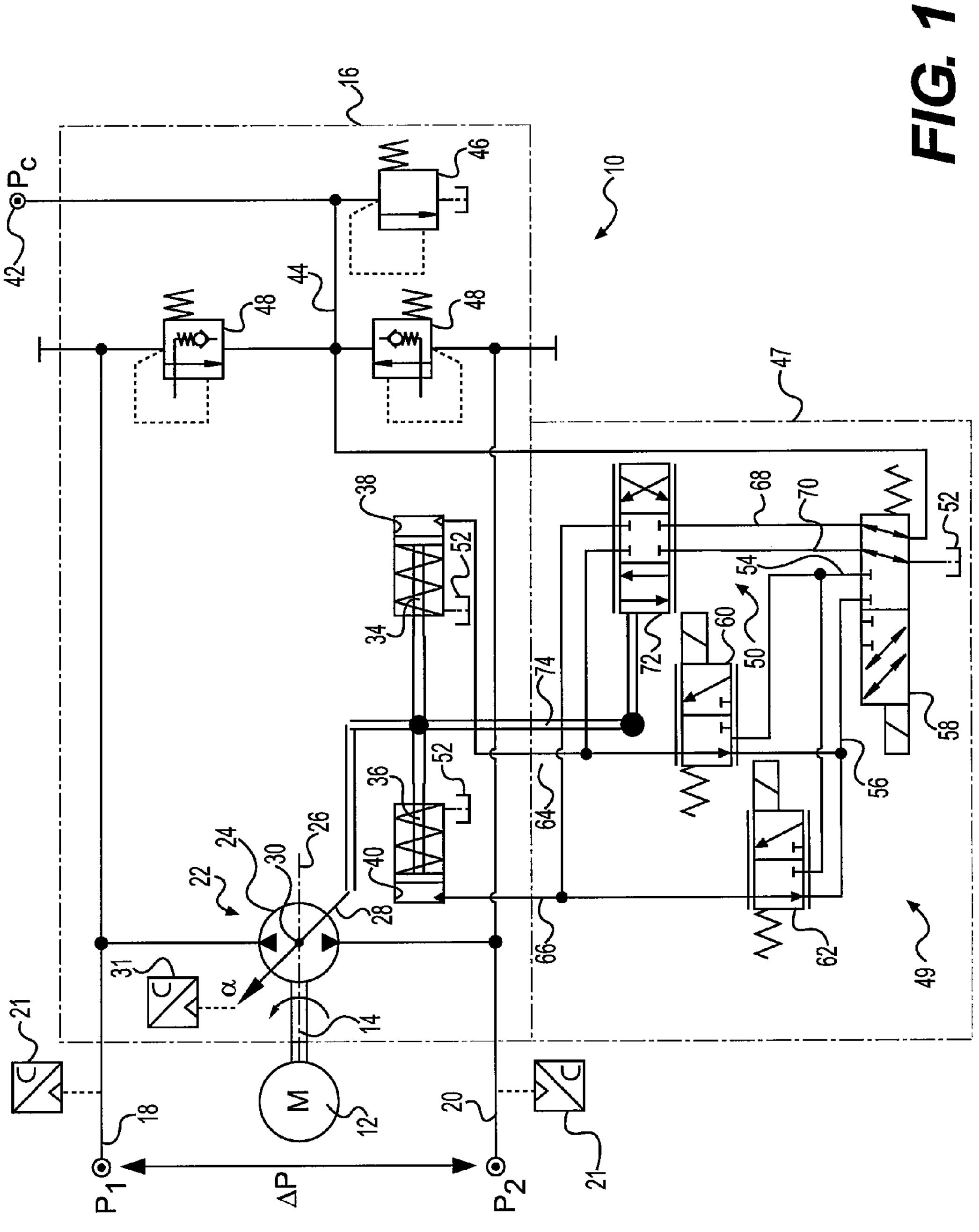
FIG. 1 is a schematic illustration of an exemplary disclosed hydraulic control system.

FIG. 1 illustrates a hydraulic pump 10. In one embodiment, hydraulic pump 10 may be driven via an input shaft 14 by an external power source 12 such as a combustion engine or motor. As such, input shaft 14 may extend from one end of a pump housing 16 for engagement with power source 12. Power source 12 may drive hydraulic pump 10 to displace fluid into a first passage 18 at a first pressure ($P_1$) while return fluid is drawn into hydraulic pump 10 from a second passage 20 at a second pressure ($P_2$), or to displace fluid into the second passage 20 while return fluid is drawn into pump 10 from first passage 18. The first and second passages 18, 20 may form a portion of an external circuit, for example a portion of a hydraulic tool circuit or a hystat transmission circuit. In one embodiment, one or more output sensors 21 may be associated with first and second passages 18, 20 to monitor an output of pump 10, for example to monitor the pressure of fluid within first and second passages 18, 20, for use in controlling pump 10.

Figure 2:
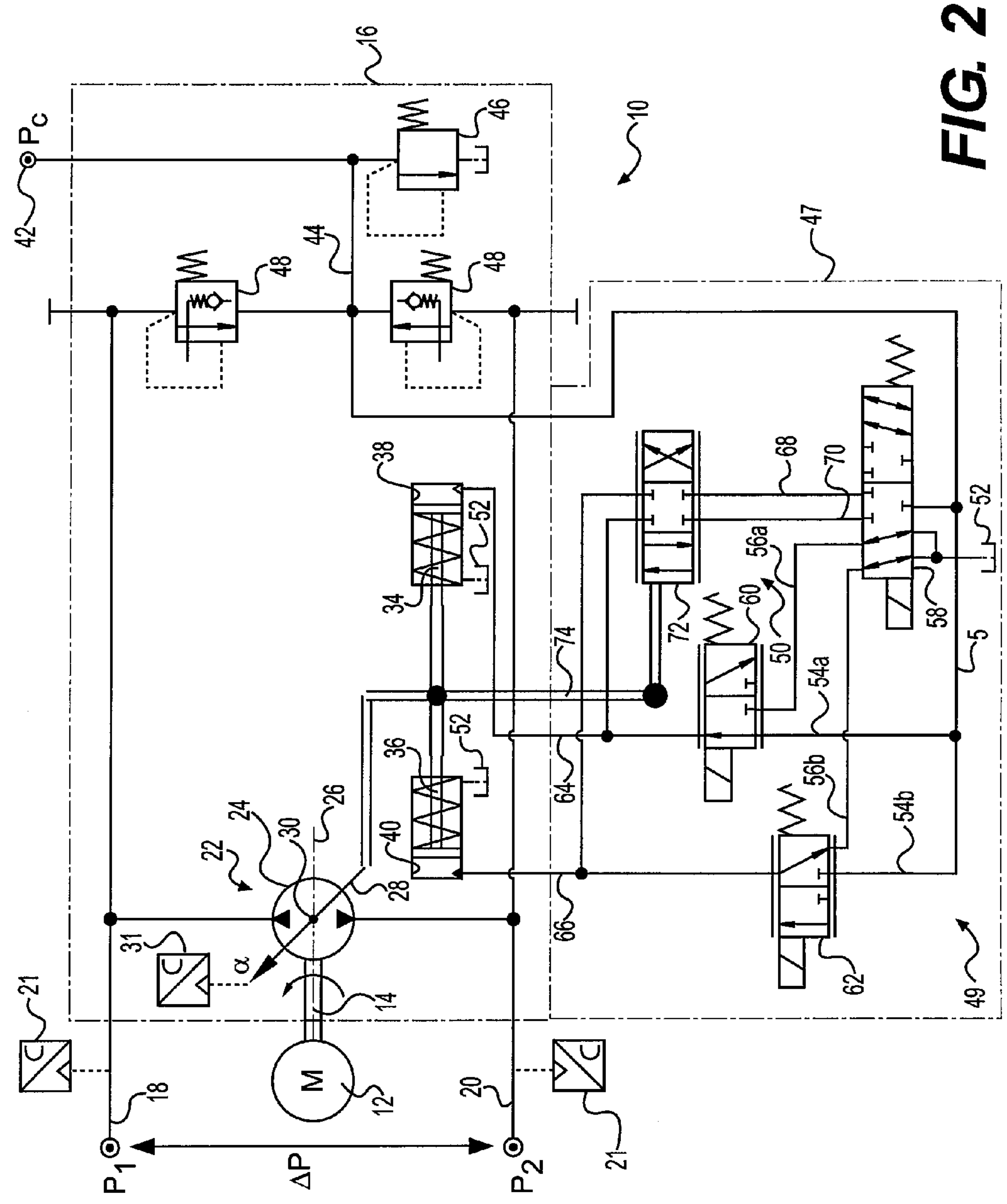
FIG. 2 is a schematic illustration of another exemplary disclosed hydraulic control system.

Housing 16 may at least partially enclose a pumping element 22 having a body 24 defining a plurality of barrels (not shown). A plunger (not shown) may be slidingly received within each of the barrels, each barrel and each associated plunger together at least partially defining a pumping chamber (not shown). It is contemplated that any number of pumping chambers may be included within body 24 and symmetrically and circumferentially disposed about a central axis 26. In the embodiment of FIG. 2, central axis 26 may be generally coaxial with input shaft 14. It is contemplated, however, that central axis 26 may be at an angle relative to input shaft 14, if desired, such as in a bent-axis type pump.

Body 24 may be connected to rotate with input shaft 14. That is, as input shaft 14 is rotated by power source 12, body 24 and the plungers located within the barrels of body 24 may all rotate together with input shaft 14 about central axis 26. Pump 10 may include a rotationally stationary swashplate 28 having a tiltable driving surface (not shown) operatively engaged with the rotating plungers by way of a joint (not shown) such as a ball and socket joint. The joints may be driven to slide along the driving surface of swashplate 28, which may be tiltably supported within housing 16. In an alternatively embodiment, body 24 and the associated plungers may be held stationary and swashplate 28 rotated, if desired.

Swashplate 28 may be tilted to vary a displacement of the plungers within respective barrels. Specifically, swashplate 28 may be situated within a bearing support member (not shown) and pivotal about a tilt axis 30. In one embodiment, tilt axis 30 may pass through and be substantially perpendicular to central axis 26. As swashplate 28 pivots about tilt axis 30, the plungers located on one half of the driving surface (relative to tilt axis 30) may retract into their associated barrels, while the plungers located on an opposing half of the driving surface may extend out of their associated barrels by the same amount. As the plungers rotate about central axis 26, the plungers may circumferentially move from the retracted side of the swashplate's driving surface to the extended side, and repeat this cycle as input shaft 14 continues to rotate.

As the plungers retract out of the barrels, low-pressure fluid may be drawn from the low-pressure one of first and second passages 18, 20 into the barrels. Conversely, as the plungers extend into the barrels, fluid may be displaced from the barrels at an elevated pressure into the high-pressure one of first and second passages 18, 20. An amount of movement between the retracted position and the extended position may relate to an amount of fluid displaced by the plungers during a single rotation of input shaft 14. Because of the connection between the plungers and the driving surface of swashplate 28, the tilt angle of swashplate 28 may directly relate to the fluid displacement of the plungers.

In one embodiment, pump 10 may be equipped with an angle sensor 31. Angle sensor 31 may be located proximal swashplate 28 and configured to measure a relative position of a portion of swashplate 28. Angle sensor 31 may then generate a signal indicative of the position, and direct the signal to a controller (not shown) for use in determining the tilt angle of swashplate 28.

Swashplate 28 may be pivoted about tilt axis 30 by way of one or more actuators, for example a first actuator 34 and a second actuator 36. First and second actuators 34, 36 may be disposed within respective bores 38, 40 of housing 16 and operatively connected to tilt swashplate 28 by extension and retraction relative to bores 38, 40. In one embodiment, first and second actuators 34, 36 may be connected directly to a bottom of swashplate 28 (i.e., to a surface of swashplate 28 opposite the driving surface). In another embodiment, first and second actuators 34, 36 may be indirectly connected to swashplate 28 by way of an arm extending from swashplate 28 or by a linkage connected to swashplate 28. It should be noted that the specific connection of first and second actuators 34, 36 to swashplate 28 can be achieved in any number of alternative ways, as long as first and second actuators 34, 36 are operatively connected to affect a tilt angle of swashplate 28. The schematic representation of the connection between first and second actuators 34, 36 and swashplate 28 provided in FIG. 1 should not limit the physical structure of the connection.

The extension and retraction of first and second actuators 34, 36 relative to bores 38, 40 may be controlled by fluid pressure. In particular, first and second actuators 34, 36 may each embody piston-type actuators that are spring-biased toward retracted positions within bores 38, 40. When a flow of pressurized fluid is communicated with, for example, bore 38, first actuator 34 may be caused to extend from bore 38. When pressurized fluid is drained from, for example, bore 40, second actuator 36 may be spring-biased to retract into bore 40. When one of first and second actuators 34, 36 is extended, while the other of first and second actuators 34, 36 is retracted, swashplate 28 may be caused to tilt toward the retracted actuator. It is contemplated that swashplate 28 may be moved from a maximum tilt angle in a first direction corresponding with first actuator 34 being fully extended, second actuator 36 being fully retracted, and a maximum amount of fluid being displaced into first passage 18; through a neutral or non-displacement position at which both first and second actuators 34, 36 are in substantially identical positions and substantially no fluid is displaced by pumping element 22; to a maximum tilt angle in a second direction corresponding with second actuator 36 being fully extended, first actuator 34 being fully retracted, and a maximum amount of fluid being displaced into second passage 20. Alternatively, it is contemplated that swashplate 28 could only be movable between a maximum tilt angle in a single direction and the neutral position by one or more of first and second actuators 34, 36 to displace fluid to only one of passages 18 and 20, if desired (i.e., in some configurations, pump 10 may not be an over-center pump).

The pressurized fluid used to move first and second actuators 34, 36 may be provided by a pilot source 42 that is offboard pump 10. In one embodiment, pilot source 42 may be another pump driven by power source 12. In this configuration, as power source 12 is operated, pilot source 42 may pressurize fluid directed to first and second actuators 34, 36 via a common supply passage 44. One or more pressure relief valves 46 may be located within pump 10 to affect the pressure of fluid within common supply passage 44. In addition, one or more makeup valves 48 may be located within pump

10 to selectively allow pressurized fluid to flow between common supply passage 44 and first and second passages 18, 20 based on a relative pressure differential. It is contemplated that the fluid used to move first and second actuators 34, 36 may, alternatively, be pressurized by pump 10, if desired.

A valve block 47 may be mounted to or integral with pump 10 to selectively communicate the flow of pressurized fluid from pilot source 42 with first and second actuators 34, 36. Valve block 47 may include a plurality of passages that at least partially define a first fluid circuit 49 and a second fluid circuit 50. Flow through both of first and second fluid circuits 49 and 50 may be independently controlled to selectively connect one or both of first and second actuators 34, 36 to common supply passage 44 or to a drain 52 and, as described above, thereby control the tilt angle of swashplate 28.

First fluid circuit 49 may include a first supply passage 54 and a first drain passage 56. First supply passage 54 may branch and extend from a failsafe valve 58 to a first actuator valve 60 and to a second actuator valve 62. First drain passage 56 may also branch and extend from failsafe valve 58 to first actuator valve 60 and second actuator valve 62. First actuator valve 60 may further be fluidly connected to first actuator 34 by way of a common first actuator passage 64. Second actuator valve 62 may further be fluidly connected to second actuator 36 by way of a common second actuator passage 66.

Second fluid circuit 50 may include a second supply passage 68 and a second drain passage 70. Second supply passage 68 may extend from failsafe valve 58 to a feedback valve 72. Second drain passage 70 may extend from failsafe valve 58 to feedback valve 72. Feedback valve 72 may further be fluidly connected to first actuator 34 by way of common first actuator passage 64 and to second actuator 36 by way of common second actuator passage 66.

Failsafe valve 58 may be a two-position, six-way, spring-biased, electrically operated valve. In particular, failsafe valve 58 may move between a first position at which first fluid circuit 49 is connected to common supply passage 44 and drain 52, and a second position (shown in FIG. 1) at which second fluid circuit 50 is connected to common supply passage 44 and drain 52. When failsafe valve 58 is in the first position, only first fluid circuit 49 may control extensions and retractions of first and second actuators 34, 36. When failsafe valve 58 is in the second position, only second fluid circuit 50 may control extensions and retractions of first and second actuators 34, 36. Failsafe valve 58 may be electrically moved (i.e., energized to move) and maintained in the first position, and spring-biased toward the second position. Thus, as long as a sufficient electric current is supplied to failsafe valve 58, failsafe valve 58 may be held in the first position against the spring bias, and when the electric current is interrupted, failsafe valve 58 may be mechanically snapped to the second position by spring force.

First actuator valve 60 may be an independent metering valve movable between a first position at which first actuator 34 is connected to first supply passage 54, and a second position (shown in FIG. 1) at which first actuator 34 is connected to first drain passage 56. First actuator valve 60 may be spring-biased to the second position and electrically powered to move to the first position. In this configuration, when failsafe valve 58 is in the first position and first actuator valve 60 is in the first position, first actuator 34 may be filled with pressurized fluid to extend from bore 38. In contrast, when failsafe valve 58 is in the first position and first actuator valve 60 is in the second position, first actuator 34 may be drained of fluid and retract into bore 38. When failsafe valve 58 is in the second position, the motion of first actuator valve 60 between the first and second positions may have substantially no affect on the motion of first actuator 34. It is contemplated that first actuator valve 60 may be moved to any position between the first and second positions while failsafe valve 58 is in the first position to vary a flow rate of fluid into and/or out of first actuator 34 and thereby vary an actuation rate of first actuator 34 and a corresponding tilt rate of swashplate 28.

Second actuator valve 62 may also be an independent metering valve movable between a first position at which second actuator 36 is connected to first supply passage 54, and a second position (shown in FIG. 1) at which second actuator 36 is connected to first drain line 56. Second actuator valve 62 may be spring-biased to the second position and electrically powered to move to the first position. In this configuration, when failsafe valve 58 is in the first position and second actuator valve 62 is in the first position, second actuator 36 may be filled with pressurized fluid to extend from bore 40. In contrast, when failsafe valve 58 is in the first position and second actuator valve 62 is in the second position, second actuator 36 may be drained of fluid and retract into bore 40. When failsafe valve 58 is in the second position, the motion of second actuator valve 62 between the first and second positions may have substantially no affect on the motion of second actuator 36. It is contemplated that second actuator valve 62 may be moved to any position between the first and second positions while failsafe valve 58 is in the first position to vary a flow rate of fluid into and/or out of second actuator 36 and thereby vary an actuation rate of second actuator 36 and a corresponding tilt rate of swashplate 28.

Feedback valve 72 may be mechanically connected to swashplate 28 to move between first, second (shown in FIG. 1), and third positions, as swashplate 28 tilts from its first displacement range at which pressurized fluid is displaced into first passage 18, through its neutral position at which no fluid is displaced, toward its second displacement range at which pressurized fluid is displaced into second passage 20. Feedback valve 72 may be connected to swashplate 28 by way of a mechanical link 74 that is operatively engaged with a portion of swashplate 28. The linkage connection between feedback valve 72 and swashplate 28 may be any type of connection known in the art, for example a rigidly fixed connection, a pivot connection, or any other suitable mechanical connection. Feedback valve 72 may translate between the first, second, and third positions in direct relation to a tilting of swashplate 28 and/or an extension of first and/or second actuators 34, 36.

When feedback valve 72 is in the second position, no fluid may be communicated between first or second actuators 34, 36 and failsafe valve 58 through feedback valve 72. When feedback valve 72 is mechanically moved by the tilting of swashplate 28 to the first position (feedback valve 72 moved to the right from the second position shown in FIG. 1) and failsafe valve 58 is in the second position, feedback valve 72 may connect second supply passage 68 to second actuator 36 to extend second actuator 36, and simultaneously connect second drain passage 70 to first actuator 34 to retract first actuator 34. When feedback valve 72 is mechanically moved by the tilting of swashplate 28 to the third position (feedback valve 72 moved to the left from the second position shown in FIG. 1) and failsafe valve 58 is in the second position, feedback valve 72 may connect second supply passage 68 to first actuator 34 to extend first actuator 34, and simultaneously connect second drain passage 70 to second actuator 36 to retract second actuator 36. When failsafe valve 58 is in the first position, the motion of feedback valve 72 between the first, second, and third positions may have substantially no affect on the motion of first or second actuators 34, 36.

In the single direction embodiment of pump 10 mentioned above (i.e., in an embodiment where pump 10 is not an over-center pump), feedback valve 72 may only be a two-position valve. That is, feedback valve 72, in the single-direction embodiment, may only move from one of the first and third positions described above, toward the second position such that feedback valve 72 functions to reduce the displacement angle of swashplate 28 from its only maximum displacement position towards its neutral position.

The connection between swashplate 28 and feedback valve 72 may result in tilt neutralizing of swashplate 28 when failsafe valve 58 is in the second position. That is, when swashplate 28 is tilted away from its neutral position and failsafe valve 58 is in the second position, feedback valve 72 may be moved to the one of the first and third positions that controls first and second actuators 34 to reduce the tilt angle of swashplate 28. In this manner, when failsafe valve 58 is in the second position, the tilting of swashplate 28 may be quickly driven to neutral by feedback valve 72 and first and second actuators 34, 36.

Electric current may be provided to failsafe valve 58 to move failsafe valve 58 to, and maintain failsafe valve 58 in, the first position during a normal operating condition when a malfunction of pump 10 has not been detected. A malfunction or failsafe condition of pump 10 may include for example, an unexpected and/or undesired pressure differential (ΔP) between first and second passages 18, 20, an electrical power failure, or another malfunction known in the art. In response to detection of a malfunction/failsafe condition, the electric current provided to failsafe valve 58 may be interrupted. It is contemplated that, during the failsafe condition, electric current directed to first and/or second actuator valves 60, 62 may also be interrupted, if desired.

In some configurations, pump 10 may be equipped with a controller (not shown) that receives input regarding a pump malfunction and responsively supplies or interrupts the electric current directed to failsafe valve 58. The controller may embody, for example, a single or multiple microprocessors, field programmable gate arrays (FPGAs), digital signal processors (DSPs), etc. that include systems for controlling various pump operations. Numerous commercially available microprocessors can be configured to perform the functions of the controller. It should be appreciated that the controller could readily embody a dedicated pump microprocessor or, alternatively, a general system microprocessor capable of controlling numerous system functions and modes of operation. If separate from a general system microprocessor, the controller may communicate with the general system microprocessor via data links or other methods.

The pump 10 of FIG. 2 is similar to the pump 10 of FIG. 1 in that the pump 10 of FIG. 2 also includes housing 16, pumping element 22, first and second actuators 34, 36, first and second actuator valves 60, 62, failsafe valve 58, and feedback valve 72. However, in contrast to pump 10 of FIG. 1, pump 10 of FIG. 2 includes two separate supply passages 54*a* and 54*b* rather than a single branched supply passage 54. In addition, pump 10 of FIG. 2 includes two separate drain passages 56*a*, 56*b* rather than a single branched drain passage 56. Further, only drain passages 56*a* and 56*b* may regulated by the failsafe valve 58 of FIG. 2. That is, in the configuration of FIG. 2, supply passages 54*a* and 54*b* may always be connected to common supply passage 44. And, during displacement control of pump 10, the electric currents supplied to failsafe valve 58 and first and second actuator valves 60, 62 may always be simultaneously interrupted.

INDUSTRIAL APPLICABILITY

The disclosed hydraulic pump finds potential application in tool systems, hystat transmissions, and other fluid pumping applications that require variable flow rates of pressurized fluid. The disclosed hydraulic pump provides for failsafe control by automatically destroking in response to a detected malfunction during a failsafe condition. Operation of hydraulic pump 10 will now be described.

During a normal operating condition of pump 10 (i.e., when a malfunction condition has not been detected), failsafe valve 58 may be provided with electric current that causes failsafe valve 58 to move to and/or be maintained in the first position. When in the first position, only first fluid circuit 49 may be used to control the tilt angle of swashplate 28. To tilt swashplate 28 in a first direction, first actuator valve 60 may be energized to move first actuator valve 60 to its first position to communicate pressurized fluid with first actuator 34, thereby causing first actuator 34 to extend from bore 38. Simultaneously, second actuator valve 62 may be de-energized to allow second actuator valve 62 to be spring-biased to its second position to drain second actuator 36, thereby causing second actuator 36 to retract into bore 38.

To tilt swashplate 28 in a second direction opposite the first direction, first actuator valve 60 may be de-energized to allow first actuator valve 60 to be spring-biased to its second position to drain first actuator 34, thereby causing first actuator 34 to retract into bore 38. Simultaneously, second actuator valve 62 may be energized to move to be spring-biased toward its first position to communicate pressurized fluid with second actuator 36, thereby causing second actuator 36 to extend from bore 40.

During operation of pump 10, a difference in pressures between first and second passages 18 and 20 may be monitored. And, in response to a detected abnormal pressure differential, in response to an electrical malfunction, and/or in response to another pump and/or system malfunction, failsafe valve 58 may be de-energized to allow failsafe valve 58 to be spring-biased toward its second position. In the embodiment of FIG. 2, first and second actuator valves 60, 62 may also be de-energized in response to the detected malfunction. When failsafe valve 58 is moved to its second position, only second fluid circuit 50 may be used to control the tilt angle of swashplate 28.

During the malfunction condition of pump 10 (i.e., when an abnormal pressure differential is detected, when an electrical power failure occurs, etc.), when swashplate 28 is tilted in the first direction, feedback valve 72 may be positioned in its first position such that first actuator 34 is drained of and second actuator 36 is communicated with pressurized fluid, thereby reducing the tilt angle of swashplate 28. As swashplate 28 swings down through the neutral position in response to the movements of first and second actuators 34, 36, feedback valve 72 may also move through its neutral position at which fluid flow to and from first and second actuators 34, 36 is blocked. If the motion of swashplate 28 overshoots the neutral position or if starting with swashplate 28 tilted in the second direction, feedback valve 72 may move to or be in the third position. In the third position, feedback valve 72 may be positioned such that second actuator 36 is drained of and first actuator 36 is communicated with pressurized fluid, thereby reducing the tilt angle of swashplate 28.

Because, the disclosed pump provides for automatic failsafe control of pumping displacement, pump operation may be quickly reduced when a malfunction is detected. In addition, little, if any, human interference may be required to reduce pump displacement during the malfunction condition.

It will be apparent to those skilled in the art that various modification and variations can be made to the disclosed hydraulic pump, without departing from the scope of the disclosure. Other embodiments of the disclosed hydraulic pump will be apparent to those skilled in the art from consideration of the specification and practice disclosed herein. It is intended that the specification and examples be considered as exemplary only, with the true scope being indicated by the following claims and their equivalents.

What is claimed is:

1. A control system for a pump, comprising:

a tiltable swashplate;

at least one actuator movable to tilt the swashplate;

a supply of pressurized fluid;

a drain;

a first circuit connectable to the supply of pressurized fluid and to the drain, and configured to control operation of the at least one actuator;

a second circuit connectable to the supply of pressurized fluid and to the drain and configured to control operation of the at least one actuator; and a failsafe valve configured to connect the first circuit to at least one of the supply and the drain only during a normal operating condition and to connect the second circuit to the supply and to the drain only during a failsafe condition, wherein the second circuit is further configured to shift the swashplate towards a non-displacement position during the failsafe condition.

2. The control system of claim 1, further including at least one electrically powered valve disposed within the first circuit and configured to regulate fluid flow between the first circuit and the at least one actuator.

3. The control system of claim 2, wherein:

the at least one actuator is a first actuator located to act on a first portion of the swashplate relative to a tilt axis of the swashplate;

the at least one electrically powered valve is a first electrically powered valve associated with control of the first actuator;

and the control system further includes:

a second actuator located to act on an opposing second portion of the swashplate relative to the tilt axis and the first portion of the swashplate; and a second electrically powered valve associated with control of the second actuator.

4. The control system of claim 3, further including a third valve mechanically connected to the swashplate and disposed within the second circuit, the third valve movable between a first position at which the first actuator is provided with pressurized fluid and the second actuator is drained of pressurized fluid, a second position at which fluid communication with both the first and second fluid actuators is blocked, and a third position at which the second actuator is provided with pressurized fluid and the first actuator is drained of pressurized fluid.

5. The control system of claim 4, wherein the failsafe valve is a two position, six-way valve connected to the supply of pressurized fluid, the drain, the first and second electrically powered valves via a branching supply passage, the first and second electrically powered valves via a branching drain passage, and at two locations to the third valve.

6. The control system of claim 4, wherein the failsafe valve is a two position, seven-way valve connected to the supply of pressurized fluid, at two locations to the drain, to the first electrically powered valve, to the second electrically powered valve, and at two locations to the third valve.

7. The control system of claim 4, further including a link mechanically connecting the swashplate to the third valve.

8. The control system of claim 7, further including a first sensor disposed proximal the swashplate to detect a position of the swashplate and responsively generate a signal indicative of a tilt angle of the swashplate.

9. The control system of claim 1, further including at least one sensor configured to detect an output of the pump, wherein the failsafe condition is associated with a malfunction of the at least one sensor.

10. The control system of claim 1, wherein the fails condition is associated with an electrical power malfunction.

11. The control system of claim 1, wherein the supply of pressurized fluid is received from offboard the pump.

12. A control system for a pump, comprising:

a tiltable swashplate;

at least one actuator movable to tilt the swashplate;

a supply of pressurized fluid;

a drain;

at least a first electrically powered valve configured to selectively connect the supply and the drain to the at least one actuator to move the at least one actuator to a desired position;

a second valve mechanically connected to the swashplate and configured to selectively connect the supply and the drain to the at least one actuator to move the tiltable swashplate toward a neutral position; and a third electrically powered valve being energized to connect the at least a first electrically powered valve to the supply and the drain during a first condition, and spring-biased to connect the second valve to the supply and the drain during a second condition.

13. The control system of claim 12, wherein:

the at least one actuator is a first actuator located to act on a first portion of the swashplate relative to a tilt axis of the swashplate;

the at least a first electrically powered valve is a first electrically powered valve associated with control of the first actuator; and the control system further includes:

a second actuator located to act on an opposing second portion of the swashplate relative to the tilt axis; and a second electrically powered valve associated with control of the second actuator.

14. The control system of claim 13, wherein the second valve is movable between a first position at which the first actuator is provided with pressurized fluid and the second actuator is drained of pressurized fluid, a second position at which fluid communication with the first and second fluid actuators is blocked, and a third position at which the second actuator is provided with pressurized fluid and the first actuator is drained of pressurized fluid.

15. The control system of claim 13, wherein the third electrically powered valve is a two position, six-way valve connected to the supply of pressurized fluid, the drain, the first and second electrically powered valves via a branching supply passage, the first and second electrically powered valves via a branching drain passage, and at two locations to the third valve.

16. The control system of claim 13, wherein the third electrically powered valve is a two position, seven-way valve connected to the supply of pressurized fluid, at two locations to the drain, to the first electrically powered valve, to the second electrically powered valve, and at two locations to the third valve.

17. A method of controlling a swashplate pump, comprising:

displacing a main flow of fluid from the swashplate pump;

selectively directing a pilot flow of fluid to and from an actuator of the swashplate pump via a first path to adjust a displacement of the swashplate pump during a first operating condition; and overriding control of the actuator via the first path by controlling flow to and from the actuator via a second path to shift the swashplate pump towards a non-displacement position during a second condition.

18. The method of claim 17, wherein the second condition is associated with a system malfunction.

19. The method of claim 17, further including sensing a pressure of the displaced fluid and responsively generating a pressure signal, wherein the second condition is associated with a value of the pressure signal.

20. The method of claim 17, further including detecting an angle of a driving surface of the swashplate pump, and responsively generating a signal indicative of a rate of the displacing.

* * * * *